United States Patent
Shim et al.

(10) Patent No.: US 11,800,503 B2
(45) Date of Patent: Oct. 24, 2023

(54) METHOD FOR TRANSMITTING/RECEIVING DATA IN WIRELESS COMMUNICATION SYSTEM AND DEVICE SUPPORTING SAME

(71) Applicant: LG ELECTRONICS INC., Seoul (KR)

(72) Inventors: Hyunjin Shim, Seoul (KR); Heejeong Cho, Seoul (KR); Jiwon Kang, Seoul (KR); Ilmu Byun, Seoul (KR); Heejin Kim, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1430 days.

(21) Appl. No.: 16/088,427

(22) PCT Filed: Dec. 16, 2016

(86) PCT No.: PCT/KR2016/014775
§ 371 (c)(1),
(2) Date: Sep. 25, 2018

(87) PCT Pub. No.: WO2017/171201
PCT Pub. Date: Oct. 5, 2017

(65) Prior Publication Data
US 2020/0305158 A1    Sep. 24, 2020

Related U.S. Application Data

(60) Provisional application No. 62/313,791, filed on Mar. 27, 2016, provisional application No. 62/313,822, filed on Mar. 28, 2016.

(51) Int. Cl.
*H04W 72/04* (2023.01)
*H04W 72/0453* (2023.01)
(Continued)

(52) U.S. Cl.
CPC ......... *H04W 72/0453* (2013.01); *H04L 5/001* (2013.01); *H04W 76/27* (2018.02)

(58) Field of Classification Search
CPC . H04W 72/0453; H04W 76/27; H04W 76/11; H04L 5/001; H04L 5/0094
See application file for complete search history.

(56) References Cited

U.S. PATENT DOCUMENTS

2009/0316664 A1* 12/2009 Wu ..................... H04W 76/19
                                                     370/336
2010/0034171 A1*  2/2010 Pelletier ............. H04W 76/27
                                                     370/331

(Continued)

FOREIGN PATENT DOCUMENTS

WO    2014181152    11/2014
WO    2015020344    2/2015

OTHER PUBLICATIONS

PCT International Application No. PCT/KR2016/014775, International Search Report dated Mar. 17, 2017, 11 pages.

*Primary Examiner* — Atique Ahmed
(74) *Attorney, Agent, or Firm* — LEE HONG DEGERMAN KANG WAIMEY

(57) ABSTRACT

The present invention relates to a method and a device for a base station transmitting/receiving data in a wireless communication system. According to the present invention, a method and a device may be provided by which a first message comprising first control information is received from a base station, wherein the first control information comprises a logical path identifier (ID) indicating a logical path for transmitting/receiving first data and second data, which is the same as the first data; as a response to the first message, a reply message is transmitted to the base station; and the first data and the second data are received on (Continued)

multiple component carriers (CC) associated with the logical path corresponding to the logical path ID.

6 Claims, 11 Drawing Sheets

(51) Int. Cl.
H04W 76/27 (2018.01)
H04L 5/00 (2006.01)

(56) References Cited

U.S. PATENT DOCUMENTS

| | | | | |
|---|---|---|---|---|
| 2011/0105107 A1* | 5/2011 | Kwon | H04W 72/04 | 455/422.1 |
| 2011/0141985 A1* | 6/2011 | Larsson | H04W 72/0453 | 370/329 |
| 2011/0300872 A1* | 12/2011 | Lim | H04W 76/34 | 455/450 |
| 2012/0315910 A1* | 12/2012 | Geary | H04W 36/00835 | 455/437 |
| 2013/0010620 A1* | 1/2013 | Dinan | H04W 76/15 | 370/252 |
| 2013/0044668 A1* | 2/2013 | Purnadi | H04W 36/0058 | 370/312 |
| 2013/0215858 A1* | 8/2013 | Jang | H04L 1/1893 | 370/329 |
| 2013/0250882 A1* | 9/2013 | Dinan | H04L 5/0053 | 370/329 |
| 2014/0192759 A1 | 7/2014 | Son et al. | | |
| 2015/0181461 A1* | 6/2015 | Kim | H04W 74/08 | 370/236 |
| 2016/0088635 A1* | 3/2016 | Davydov | H04L 1/1822 | 370/329 |

* cited by examiner

METHOD FOR TRANSMITTING/RECEIVING DATA IN WIRELESS COMMUNICATION SYSTEM AND DEVICE SUPPORTING SAME

CROSS-REFERENCE TO RELATED APPLICATIONS

This application is the National Stage filing under 35 U.S.C. 371 of International Application No. PCT/KR2016/014775, filed on Dec. 16, 2016, which claims the benefit of U.S. Provisional Application No. 62/313,791, filed on Mar. 27, 2016, and 62/313,822, filed on Mar. 28, 2016, the contents of which are all hereby incorporated by reference herein in their entireties.

TECHNICAL FIELD

The present invention relates to a method for a user equipment to transmit and receive data in a wireless communication system and, more particularly, to a method of improving reliability of data transmission and reception and an apparatus supporting the same.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

DISCLOSURE

Technical Problem

An object of the present invention is to provide a method and apparatus for duplicating and transmitting the same data in order to improve reliability of data transmission.

Furthermore, an object of the present invention is to provide a method and apparatus for transmitting the same data through multiple component carriers (CCs) to which a carrier aggregation (CA) has been applied.

Furthermore, an object of the present invention is to provide a method and apparatus for configuring or reconfiguring a logical path and quality for the duplicate transmission of the same data.

Furthermore, an object of the present invention is to provide a method and apparatus for configuring a separate identifier (ID) in order to identify a logical path for transmitting duplicate data.

Furthermore, an object of the present invention is to provide a method and apparatus for transmitting an indicator, providing notification that the same downlink data is duplicated and transmitted, through control information when the same downlink data is duplicated and transmitted.

Technical objects to be achieved in this specification are not limited to the aforementioned technical objects, and other technical objects not described above may be evidently understood by a person having ordinary skill in the art to which the present invention pertains from the following description.

Technical Solution

In order to solve the aforementioned problems, the present invention provides a method and apparatus for a device to transmit and receive data in a wireless communication system.

Specifically, a method of transmitting and receiving data according to an embodiment of the present invention provides a method including receiving, from a base station, a first message including first control information, wherein the first control information includes a logical path identifier (ID) indicative of a logical path for a transmission and reception of first data and second data identical with the first data; transmitting, to the base station, a response message as a response to the first message; and receiving the first data and the second data on a plurality of component carriers (CCs) associated with the logical path corresponding to the logical path identifier.

Furthermore, in the present invention, the first data and second data are received through different component carriers.

Furthermore, in the present invention, the first data is received through a first data channel on a first component carrier, and the second data is received through a second data channel on a second component carrier. The first component carrier and the second component carrier are included in the plurality of component carriers.

Furthermore, in the present invention, the first data channel and the second data channel are associated with the logical path corresponding to the logical path identifier.

Furthermore, the present invention further includes receiving second control information through the first data channel and the second data channel or one of the first data channel and the second data channel from the base station. The second control information includes an identifier indicating that the first data and the second data are transmitted on different component carriers by the base station.

Furthermore, in the present invention, the first message is a connection reconfiguration message for changing an RRC connection configuration with the base station.

Furthermore, the present invention further includes receiving downlink scheduling information for the reception of the first data and second data through the first data channel and the second data channel from the base station. The downlink scheduling information includes at least one of position information of a resource for the reception of the first data and second data, information of the user equipment, or transport region information of the first data and second data.

Furthermore, the present invention further includes receiving downlink scheduling information for the reception of the first data and second data through one of the first data channel and the second data channel from the base station. The downlink scheduling information includes at least one of position information of a resource for the transmission of the first data and second data, information of the user equipment, or transport region information of the first data and second data.

Furthermore, the present invention further includes decoding the first data and second data based on parity bits. The first data and the second data are each set different parity bits.

Furthermore, in the present invention, further includes decoding the first data and second data based on a first transport block including transport blocks for transmitting the first data and the second data, respectively, through the plurality of component carriers.

Furthermore, the present invention further includes calculating log likelihood ratio (LLR) values of the first data and second data, respectively, and decoding the first data and the second data based on an added value of the LLR values.

Furthermore, the present invention further includes decoding the plurality of data based on transport blocks for transmitting the first data and the second data, respectively, through the plurality of component carriers. The sizes of the transport blocks are identical.

Furthermore, the present invention provides a user equipment for transmitting and receiving data in a wireless communication system. The user equipment includes a communication unit configured to transmit and receive radio signals externally and a processor functionally connected to the communication unit. The processor is configured to receive, from a base station, a first message including first control information, wherein the first control information includes a logical path identifier (ID) indicative of a logical path for a transmission and reception of first data and second data identical with the first data, transmit, to the base station, a response message as a response to the first message, and receive the first data and the second data on plurality of component carriers (CCs) associated with the logical path corresponding to the logical path identifier.

Advantageous Effects

The present invention has an advantage in that it can improve reliability of data transmission by transmitting the same data through multiple component carriers (CCs) to which a carrier aggregation (CA) has been applied.

Furthermore, the present invention has an advantage in that it can duplicate and transmit the same data by configuring or reconfiguring a logical path and quality.

Furthermore, the present invention has an advantage in that a user equipment can identify a logical path in which duplicate data is transmitted by configuring a separate identifier (ID) in order to identify a logical path for the transmission of duplicate data.

Furthermore, the present invention has an advantage in that a user equipment can identify whether duplicated downlink data is transmitted by transmitting an indicator, providing notification that the same downlink data is duplicated and transmitted, through control information when the same downlink data is duplicated and transmitted.

Effects which may be obtained in this specification are not limited to the aforementioned effects, and other technical effects not described above may be evidently understood by a person having ordinary skill in the art to which the present invention pertains from the following description.

DESCRIPTION OF DRAWINGS

The accompanying drawings, which are included herein as a part of a description in order to help understanding of the present invention, provide embodiments of the present invention, and describe the technical features of the present invention with the description below.

MODE FOR INVENTION

Figure 1:
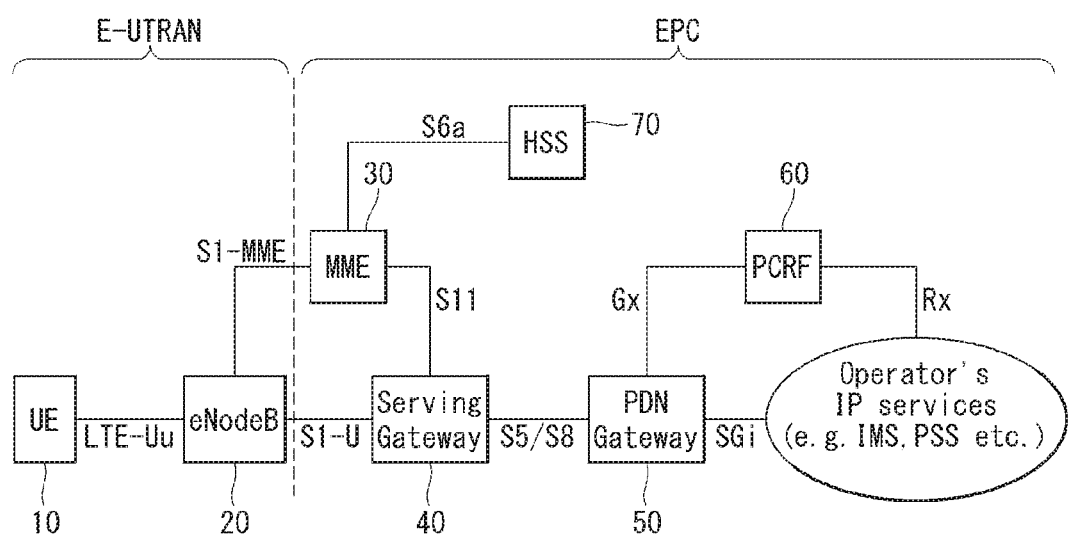
FIG. 1 illustrates an Evolved Packet System which is associated with the Long Term Evolution (LTE) system to which the present invention can be applied.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term "eNB" may be replaced with the term "fixed station", "base station (BS)", "Node B", "base transceiver system (BTS),", "access point (AP)", "MeNB (Macro eNB)", "SeNB (Secondary eNB)" etc. The term "user equipment (UE)" may be replaced with the term "terminal", "mobile station (MS)", "user terminal (UT)", "mobile subscriber station (MSS)", "subscriber station (SS)", "Advanced Mobile Station (AMS)", "Wireless terminal (WT)", "Machine-Type Communication (MTC) device", "Machine-to-Machine (M2M) device", "Device-to-Device (D2D) device", wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), "non-orthogonal multiple access (NOMA)", etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs O1-DMA for downlink and SC-FDMA for uplink. LTE-A is an evolution of 3GPP LTE.

Embodiments of the present invention may be supported by the standard documents disclosed in at least one of IEEE 802, 3GPP and 3GPP2 that are radio access systems. That is, steps or portions not described so that the technical spirit of the present invention is not clearly exposed in the embodiments of the present invention may be supported by the documents. Furthermore, all terms disclosed in this document may be described by the standard documents.

In order to clarify the description, 3GPP LTE/LTE-A is basically described, but the technical characteristic of the present invention is not limited thereto and may be applied to a 5G system.

Prior to a description given with reference to the drawings, in order to help understanding of the present invention, terms used in this specification are defined in brief.

EPS: an abbreviation of an evolved packet system, and the EPS means a core network supporting a long term evolution (LTE) network. It is a network of a form in which an UMTS has been evolved Public data network (PDN): an independent network where a server providing services is located Access point name (APN): It is provided to a UE in the name of an access point managed by a network. That is, this indicates the name (text string) of a PDN. A corresponding PDN for the transmission and reception of data is determined based on the name of an access point.

Tunnel endpoint identifier (TEID): an end point ID of a tunnel configured between nodes within a network, and the TEID is configured for each section in a bearer unit of each UE.

MME: an abbreviation of a mobility management entity, and the MME functions to control each entity within an EPS in order to provide a session and mobility for a UE.

Session: a session is a passage for data transmission, and a unit thereof may be a PDN, a bearer or an IP flow unit.

A difference between units may be divided into a target network entire unit (APN or PDN unit), a unit (bearer unit) classified as QoS therein, and a destination IP address unit as defined in 3GPP.

EPS Bearer: a logical path generated between a UE and a gateway, in which a variety of types of traffic is transmitted and received.

Default EPS bear: a logical path for data transmission and reception basically generated when a UE accesses a network and can be maintained until the UE is detached from the network.

Dedicated EPS bearer: a logical path generated when it is necessary to additionally provide services after a default EPS bearer is generated.

IP flow: a variety of types of traffic transmitted and received through a logical path between a UE and a gateway.

Service data flow (SDF): a combination of IP flows of user traffic or multiple IP flows classified depending on a service type.

PDN connection: this indicates a connection from a UE to a PDN, that is, association (connection) between a UE represented as an ip address and a PDN represented as an APN. This means a connection (UE-PDN GW) between entities within a core network so that a session can be formed.

UE Context: context information of a UE used to manage a UE in a network, that is, context information including a UE id, mobility (current location), and the attributes (QoS, priority) of a session FIG. 1 is a view illustrating an Evolved Packet System which is associated with the Long Term Evolution (LTE) system to which the present invention may apply.

The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE.

When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA).

Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

Figure 2:
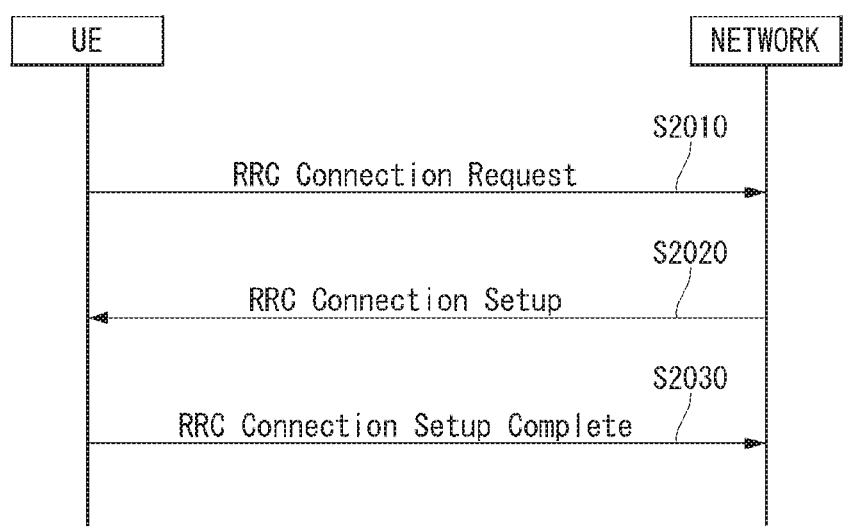
FIG. 2 is a flowchart illustrating a process of establishing an RRC connection to which the present invention may be applied.

FIG. 2 is a flowchart showing an RRC connection establishment procedure to which the present invention may apply.

A UE sends to a network an RRC connection request message for requesting an RRC connection (S2010). The network sends an RRC connection setup message in response to the RRC connection request (S2020). After receiving the RRC connection setup message, the UE enters an RRC connection mode.

The UE sends to the network an RRC connection setup complete message used to confirm successful completion of the RRC connection establishment (S2030).

Figure 3:
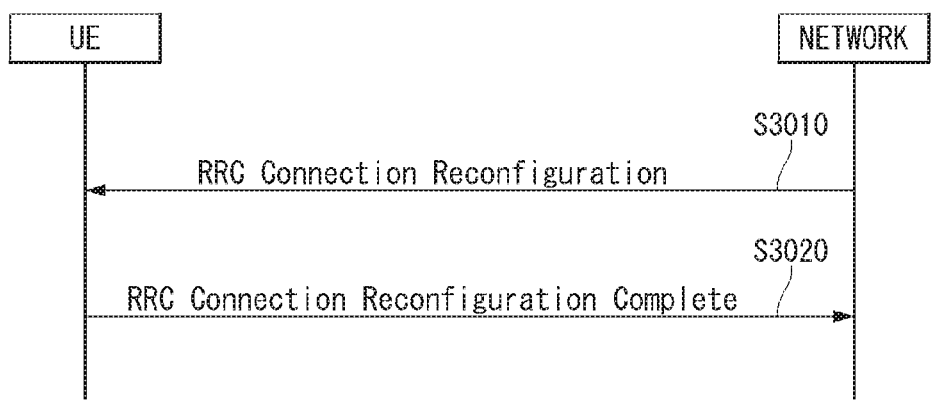
FIG. 3 is a flowchart illustrating an RRC connection reconfiguration process to which the present invention may be applied.

FIG. 3 is a flowchart showing an RRC connection reconfiguration procedure to which the present invention may apply.

An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (S3010). In response to the RRC connection reconfiguration, the UE sends to the network an RRC connection reconfiguration complete message used to confirm successful completion of the RRC connection reconfiguration (S3020).

General Carrier Aggregation

A communication environment considered in the embodiments of the present invention includes all of multi-carrier support environments.

That is, a multi-carrier system or carrier aggregation (CA) system used in the present invention refers to a system using an aggregation of one or more component carriers (CCs) having a bandwidth smaller than a target band when a target wideband is configured in order to support the wideband.

In the present invention, a multi-carrier means an aggregation of carriers (or a carrier aggregation). In this case, an aggregation of carriers means both an aggregation between contiguous carriers and an aggregation between non-contiguous carriers.

Furthermore, the number of component carriers aggregated in the downlink and the number of component carriers aggregated in the uplink may be differently configured. A case where the number of downlink component carriers (hereafter referred to as a "DL CC") and the number of uplink component carriers (hereafter referred to as an "UL CC") are the same is called a symmetric aggregation. A case where the number of DL CCs and the number of UL CCs are different is called an asymmetric aggregation. Such a carrier aggregation may be interchangeably used with terms, such as a carrier aggregation, a bandwidth aggregation and a spectrum aggregation.

A carrier aggregation composed of a combination of two or more component carriers has a target of supporting a 100 MHz bandwidth in the LTE-A system. When one or more carriers having a bandwidth smaller than a target band are combined, the bandwidth of the combined carrier may be limited to a bandwidth used in the existing system in order to maintain backward compatibility with the existing IMT system. For example, the existing 3GPP LTE system supports {1.4, 3, 5, 10, 15, 20} MHz bandwidths, and a 3GPP LTE-advanced system (i.e., LTE-A) may support a bandwidth greater than 20 MHz using only the bandwidths for compatibility with the existing system.

Furthermore, a carrier aggregation system used in the present invention may define a new bandwidth regardless of a bandwidth used in the existing system in order to support a carrier aggregation.

An LTE-A system uses the concept of a cell in order to manage radio resources.

The aforementioned carrier aggregation environment may refer to a multi-cell environment. A cell is defined as a combination of a pair of a downlink resource (DL CC) and an uplink resource (UL CC), but the uplink resource is not an essential element. Accordingly, a cell may include a downlink resource solely or a downlink resource and an uplink resource. If a specific UE has only one configured serving cell, it may have one DL CC and one UL CC. If a specific UE has two or more configured serving cells, it has DL CCs corresponding to the number of cells. The number of UL CCs may be equal to or smaller than the number of DL CCs.

Alternatively, a DL CC and an UL CC may be configured to the contrary. That is, if a specific UE has multiple configured serving cells, a carrier aggregation environment in which the number of UL CCs is greater than the number of DL CCs may be supported. That is, a carrier aggregation may be understood as an aggregation of cells having two or more different carrier frequencies (center frequency of a cell). A "cell" referred in this case needs to be distinguished from a "cell" as a commonly used area covered by a base station.

A cell used in the LTE-A system includes a primary cell (PCell) and a secondary cell (SCell). A P cell and an S cell may be used as a serving cell. In the case of a UE which is in the RRC_CONNECTED state, but in which a carrier aggregation has not been configured or which does not support a carrier aggregation, only one serving cell including a P cell is present. In contrast, in the case of a UE which is in the RRC_CONNECTED state and in which a carrier aggregation has been configured, one or more serving cells may be present. All of serving cells include a P cell and one or more S cells.

A serving cell (P cell and S cell) may be configured through an RRC parameter. PhysCellId is the physical layer identifier of a cell and has an integer value from 0 to 503. SCellIndex is a short identifier used to identify an S cell and has an integer value from 1 to 7. ServCellIndex is a short identifier used to identify a serving cell (P cell or S cell) and has an integer value from 0 to 7. A 0 value is applied to a P cell, and SCellIndex is previously assigned to be applied to an S cell. That is, a cell having the smallest ID (or cell index) in ServCellIndex becomes a P cell.

A P cell means a cell operating on a primary frequency (or primary CC). A P cell may be used by a UE to perform an initial connection establishment process or a connection reconfiguration process, and may refer to a cell indicated in a handover process. Furthermore, a P cell means a cell that is the center of control-related communication among serving cells configured in a carrier aggregation environment. That is, a UE may receive a PUCCH allocated only in its P cell and perform transmission, and may use a P cell to obtain system information or change a monitoring procedure. An evolved universal terrestrial radio access network (E-UTRAN) may change only a P cell for a handover procedure using an RRC connection reconfiguration (RRC-ConnectionReconfigutaion) message including mobility control information (mobilityControlInfo) with respect to a UE supporting a carrier aggregation environment.

An S cell may mean a cell operating on a secondary frequency (or secondary CC). Only one P cell is allocated to a specific UE, and one or more S cells may be allocated to a specific UE. An S cell may be configured after an RRC connection is established and may be used to provide an additional radio resource.

A PUCCH is not present in the remaining cells, that is, an S cell, except a P cell of serving cells configured in a carrier aggregation environment. An E-UTRAN may provide all of types of system information related to the operation of a cell in the RRC_CONNECTED state through a dedicated signal when adding an S cell to a UE supporting a carrier aggregation environment. A change in the system information may be controlled by the release and addition of a related S cell. In this case, an RRC connection reconfiguration (RRC-ConnectionReconfigutaion) message of a higher layer may be used. An E-UTRAN may perform dedicated signaling having a different parameter for each UE rather than broadcasting within a related S cell.

After an initial security activation process starts, an E-UTRAN may configure a network including one or more S cells by adding them to a P cell initially configured in a connection configuration process. In a carrier aggregation environment, a P cell and an S cell may operate as respective component carriers. In the following embodiment, a primary component carrier (PCC) may be used as the same meaning as a P cell, and a secondary component carrier (SCC) may be used as the same meaning as an S cell.

Figure 4:
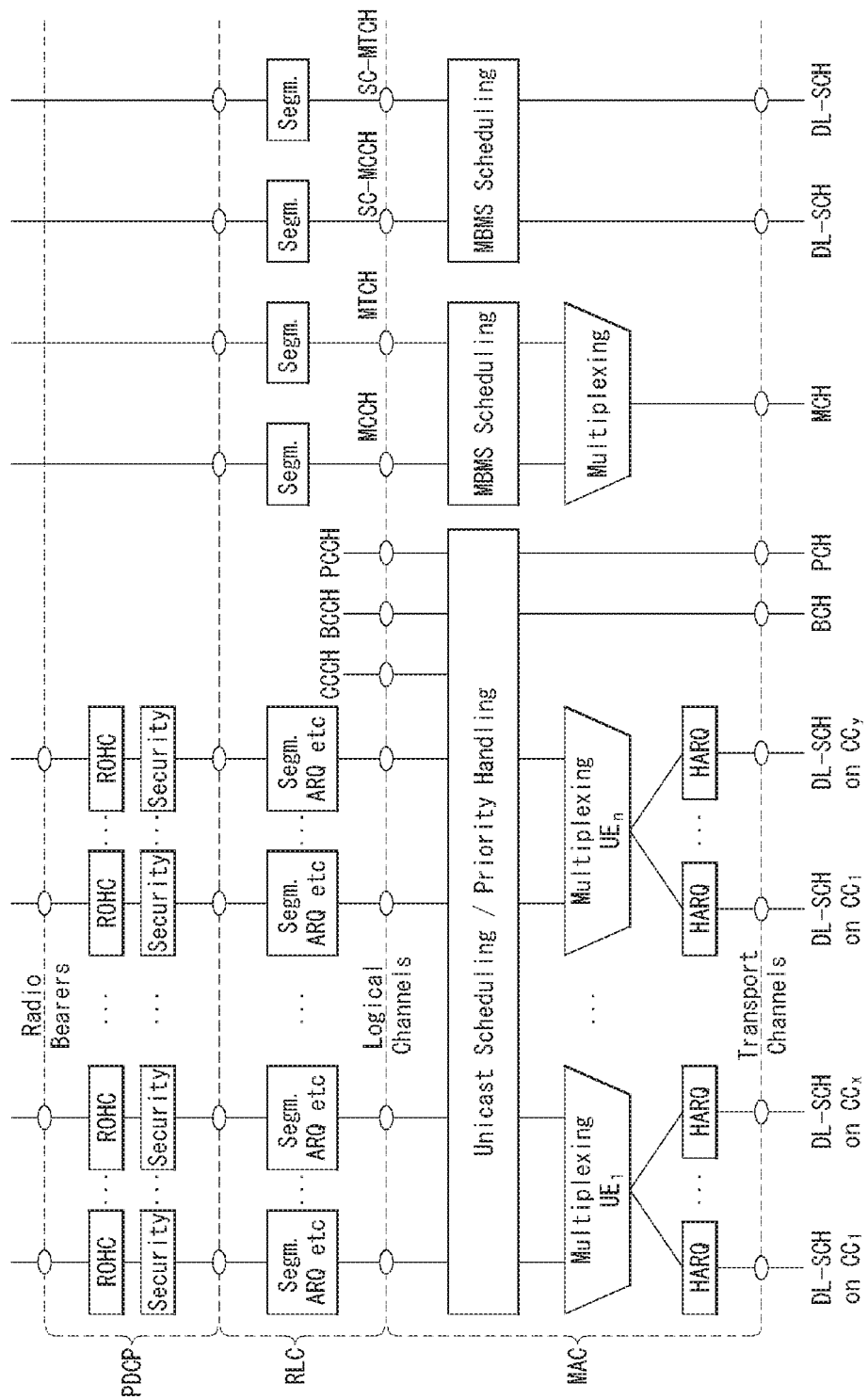
FIGS. 4 and 5 are diagrams showing examples of Layer 2 structures in carrier aggregations to which the present invention may be applied.
Figure 5:
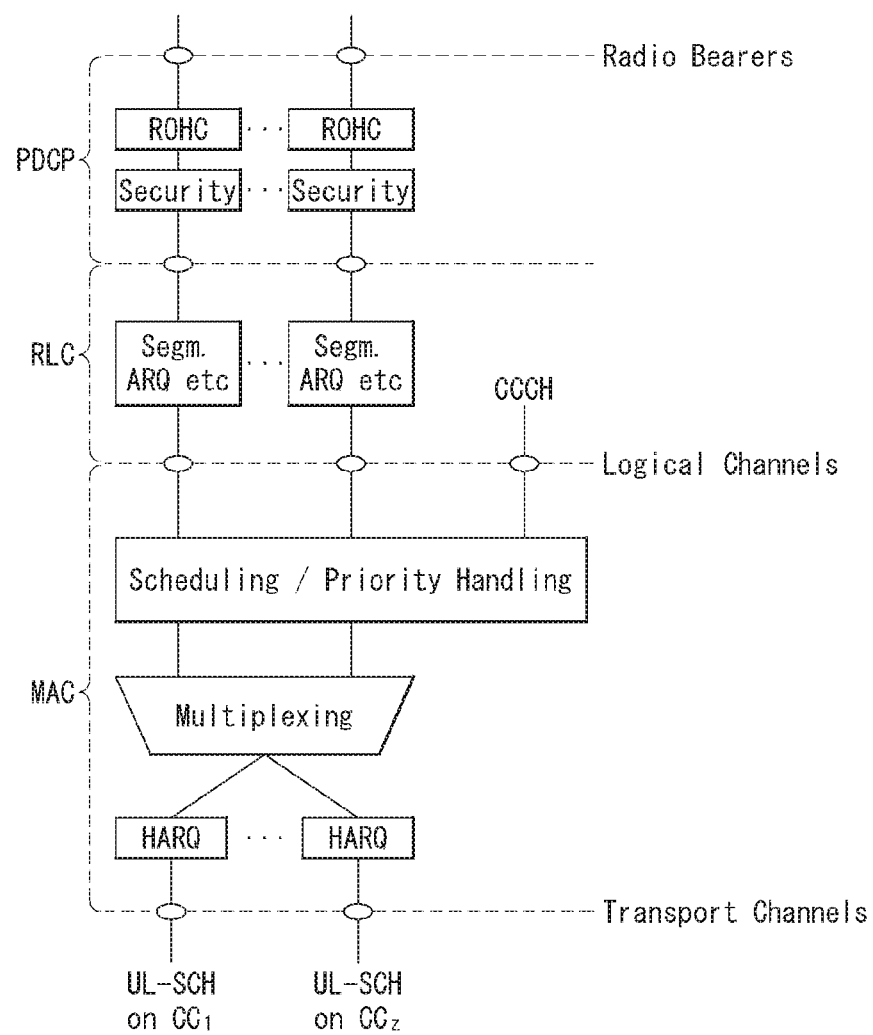

FIGS. 4 and 5 are diagrams showing examples of Layer 2 structures in a carrier aggregation to which the present invention may be applied.

FIG. 4 shows an example of a Layer 2 structure in a carrier aggregation for the transmission of downlink data, and FIG. 5 shows an example of a Layer 2 structure in a carrier aggregation for the transmission of uplink data.

Referring to FIGS. 4 and 5, in the case of a carrier aggregation, in order for one HARQ entity to be required in each serving cell, a multi-carrier of a physical layer is exposed only in a MAC layer.

In the uplink and downlink, if one independent HARQ entity is present in each serving cell and spatial multiplexing is not present, one transport block is generated for each TTI in each serving cell. Each transport block and potential HARQ retransmissions thereof are mapped to a single serving cell.

Figure 6:
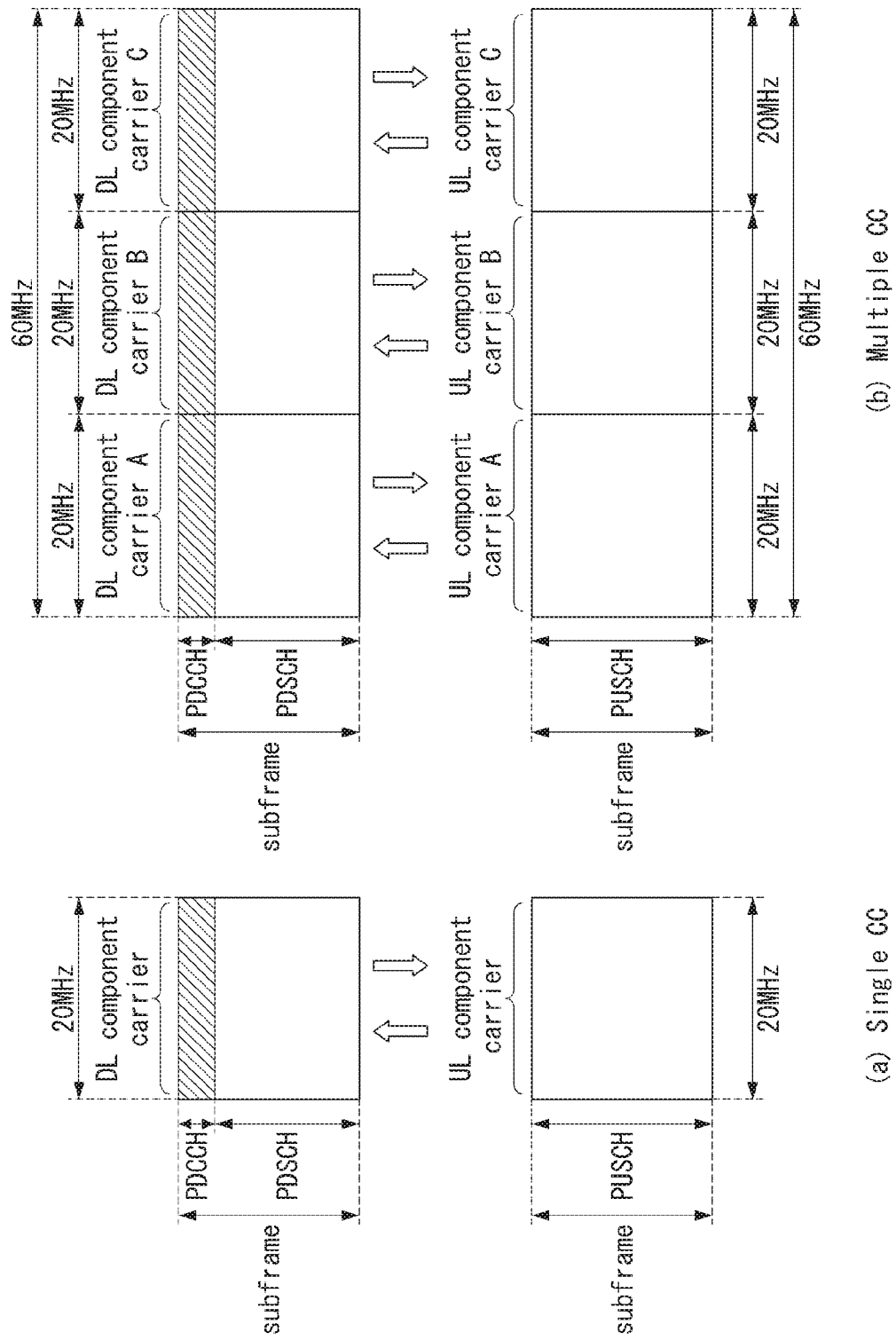
FIG. 6 is a diagram showing an example of component carriers and carrier aggregations in a wireless communication system to which the present invention may be applied.

FIG. 6 is a diagram showing an example of component carriers and carrier aggregations in a wireless communication system to which the present invention may be applied.

FIG. 6(a) shows a single carrier structure used in the LTE system. A component carrier may include a DL CC and an UL CC. One component carrier may have a frequency range of 20 MHz.

FIG. 6(b) shows carrier aggregation structured in the LTE_A system. FIG. 6(b) shows a case where 3 component carriers, each one having a frequency size of 20 MHz, have been combined. Three DL CCs and three UL CCs are included, but the number of DL CCs and UL CCs is not limited. In the case of a carrier aggregation, a UE can monitor three CCs at the same time, can receive a downlink signal/data, and can transmit an uplink signal/data.

If N DL CCs are managed in a specific cell, a network may allocate M (M≤N) DL CCs to a UE. In this case, the UE may monitor only the M limited DL CCs and receive a DL signal. Furthermore, the network may allocate major DL CCs to the UE by giving priority to L (L≤M≤N) DL CCs. In such a case, the UE must monitor the L DL CCs. Such a method may be identically applied to uplink transmission.

Linkage between the carrier frequency (or DL CC) of a downlink resource and the carrier frequency (or UL CC) of an uplink resource may be indicated by a higher layer message, such as an RRC message, or system information. For example, a combination of a DL resource and an UL resource may be configured by linkage defined by a system information block Type2 (SIB2). Specifically, the linkage may mean a mapping relation between a DL CC in which a PDCCH carrying an UL grant is transmitted and an UL CC using the UL grant, and may mean a mapping relation between a DL CC (or UL CC) in which data for an HARQ is transmitted and an UL CC (or DL CC) in which an HARQ ACK/NACK signal is transmitted.

Dual Connectivity (DC)

In a heterogeneous network supporting small cell evolution, there are various requirements related to mobility robustness, signaling load increased due to frequent handover, throughput improvement per user, and a system capacity.

As a solution for realizing such requirements, in an E-UTRAN, various RX/TX UEs are provided by two different schedulers in RRC_CONNECTED. The E-UTRAN supports a dual connectivity (DC) operation configured to use a radio resource located in two eNBs connected through non-ideal backhaul through an X2 interface.

Dual connectivity may imply control and data separation. For example, control signaling for mobility is provided through a macro cell at the same time as the time when a high-speed data connection is provided through a small cell. Furthermore, separation between the downlink and the uplink and a connection between the downlink and the uplink are provided by different cells.

eNBs related to dual connectivity for a specific UE may assume to have two different roles. For example, one eNB may behave as an MeNB or SeNB.

In dual connectivity, a UE may be connected to one MeNB and one SeNB.

An MeNB is an eNB that terminates at least one S1-MME in dual connectivity (DC). An SeNB is an eNB that provides an additional radio resource for a UE, but is not a master eNB in dual connectivity.

Additionally, DC in which a CA has been configured means an operation mode of a UE in the RRC connection state, and includes a master cell group and a secondary cell group.

In this case, a "cell group" indicates a group of serving cells related to a master eNB (MeNB) or secondary eNB (SeNB) in dual connectivity.

A "master cell group (MCG)" is a group of serving cells related to an MeNB, and includes a primary cell (PCell) and optionally one or more secondary cells (SCells) in dual connectivity.

A "secondary cell group (SCG)" indicates a group of serving cells related to an SeNB including a primary SCell (pSCell) and optionally one or more SCells.

In this case, a "cell" described hereinafter must be distinguished from a "cell" as a common area covered by an eNB. That is, a cell indicates a combination of the downlink and optionally an uplink resource.

Linking between the carrier frequency of a downlink resource (e.g., the center frequency of a cell) and the carrier frequency of an uplink resource is indicated in system information transmitted in downlink resources.

An MCG bearer is a radio protocol located only in an MeNB in order to use only an MeNB resource in dual connectivity. An SCG bearer is a radio protocol located only in an SeNB in order to use an SeNB resource in dual connectivity.

Furthermore, a split bearer is a radio protocol located in both an MeNB and an SeNB in order to use both MeNB and SeNB resources in dual connectivity.

A future communication technology, such as 5G, has an object of constructing an ultra-low latency system having an extremely short response time in order to satisfy various requirements as requirements for supporting various real-time application services increase.

Furthermore, in services that require such ultra-low latency, a scenario that requires data transmission of high reliability in addition to latency is taken into consideration. Accordingly, there is a need for a technology for transmitting data rapidly with high reliability (about 99.999%) (ultra-reliable and low latency communication, URLLC).

In the low latency and high reliability service, high reliability is required by transmitting a data packet in a short TTI. A method for satisfying such high reliability includes transmission through a time diversity method and transmission through a frequency diversity method.

The time diversity method means a method capable of securing excellent transmission quality by synthesizing received data on the reception side when the transmission side transmits the same data several times at a time interval on the time axis.

The frequency diversity method means a method capable of preventing fading by selecting excellent received data or synthesizing different data using the property that each frequency has a different reception characteristic when the transmission side transmits the same data in several frequencies on the frequency axis.

In the low latency and high reliability service, it is difficult to obtain a gain using the time diversity method of the two methods because data is transmitted in a short TTI. Accordingly, a gain of time diversity can be obtained if different frequencies of multiple CCs are used for data transmission using the aforementioned CA.

Furthermore, in the low latency and high reliability service, a bandwidth of a high capacity may be necessary because a data packet is transmitted in a short TTI. In this case, if the CA is used, a wider bandwidth can be secured because multiple CCs are used.

Furthermore, if the same data is duplicated and transmitted in each CC, reliability for the data can be increased.

However, the aforementioned CA has a problem in that the same data cannot be transmitted through multiple CCs because there is no method for a UE to recognize the same data although a base station transmits the same data through multiple CCs.

Accordingly, in order to solve such a problem, the present invention proposes a method for a base station to notify a UE of the same data so that the same data is received from multiple different CCs.

Figure 7:
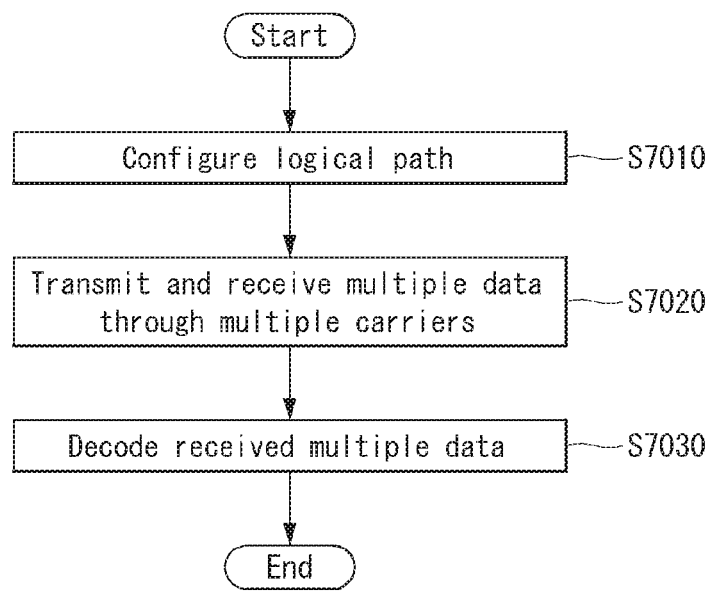
FIG. 7 is a flowchart showing an example of a method for transmitting the same data, which is proposed in this specification.

FIG. 7 is a flowchart showing an example of a method for transmitting the same data, which is proposed in this specification.

Referring to FIG. 7, a separate logical path (e.g., data radio bearer) for transmitting the same data (duplicated data) may be configured. A UE may duplicate and transmit and receive the same data through the configured logical path with a base station. Reliability of data transmission and reception can be improved by decoding the same data.

Specifically, the UE may configure a logical path for transmitting and receiving the data of a specific service through a connection with the base station (S7010).

In this case, the UE and the base station may generate the logical path for duplicating and transmitting the same data in order to provide a high reliability and low latency service. The base station may transmit the ID or identifier of a logical path to the UE in order to notify the UE that the generated logical path is for duplicating and transmitting the same data while generating the logical path.

The UE and the base station may duplicate, transmit and receive the same data on multiple carriers or multiple component carriers corresponding to the generated identifier of the logical path (S7020).

For example, the first data may be transmitted and received through a first component carrier, and second data identical with the first data may be transmitted and received through a second component carrier.

In this case, the first component carrier and the second component carrier may be carriers corresponding to a logical path identifier indicative of the generated logical path.

Thereafter, the UE may decode the multiple received same data through a specific method (S7030).

Through such a method, the UE and the base station can decode data accurately although some of the multiple received same data is damaged or distorted.

Figure 8:
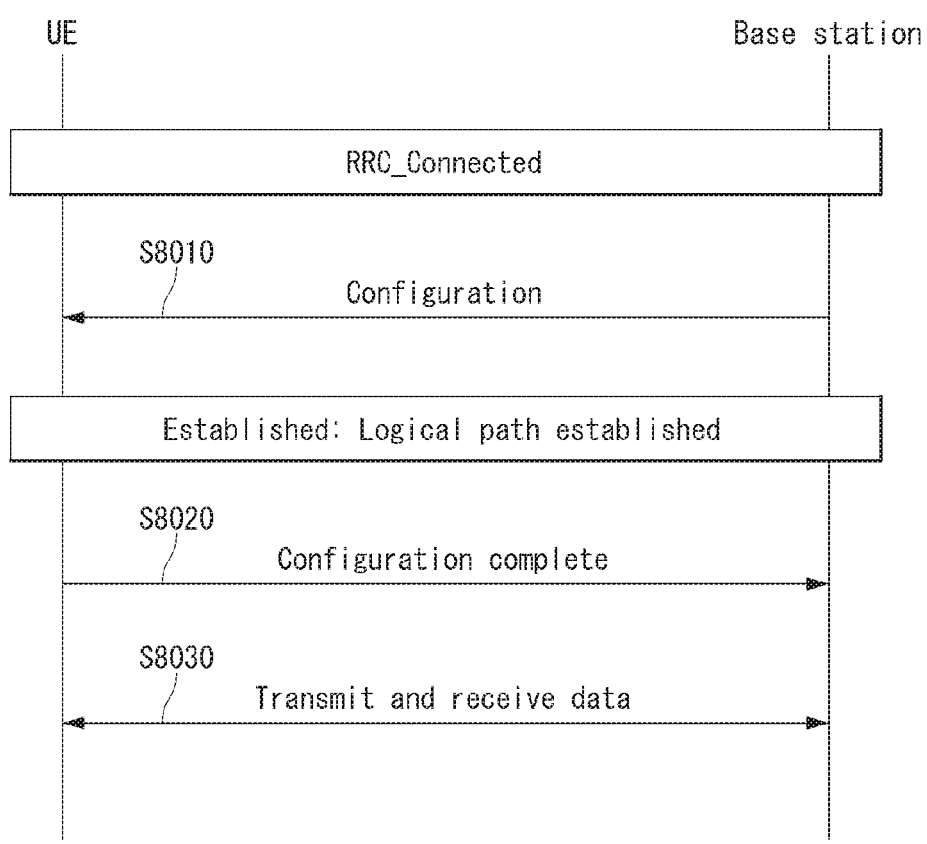
FIG. 8 is a flowchart showing an example of a method for configuring a logical path for transmitting the same data, which is proposed in this specification.

FIG. 8 is a flowchart showing an example of a method for configuring a logical path for transmitting the same data, which is proposed in this specification.

Referring to FIG. 8, a UE in a connection state (e.g., RRC_Connected state) may form a specific logical path for duplicating and transmitting the same data in a process of forming a logical path with a base station.

Specifically, the base station may configure the logical path with the UE of the connection state.

The base station may configure a specific logical path along which the same data can be duplicated and transmitted while configuring the logical path with the UE.

In this case, in the logical path configuration process, the base station may transmit a configuration message (e.g., RRC Connection Reconfiguration message) to the UE (S8010).

The base station may include control information (first control information), for example, a radio resource information element in the configuration message. The control information may include a list (e.g., drb-ToAddModeList) including the ID of the specific logical path and/or an indicator indicating that the specific logical path is a logical path for duplicating and transmitting the same data.

For example, in the case of a logical path capable of duplicate transmission, the indicator may be set to "1." In the case of a logical path incapable of duplicate transmission, the indicator may be set to "0."

In this case, the indicator may be extended to 2 bits or more by extending it in the type information form of the specific logical path. For example, a type for indicating a specific logical path configured for each service that requires the duplicate transmission of the same data may be defined.

Table 1 shows an example of the IDs of logical paths when a logical path capable of the duplicate transmission of the same data is identified based on an ID.

TABLE 1

| Value (hexa-decimal) | DRB ID |
|---|---|
| 0000-FFF3 | Logical path capable of the duplicate transmission and reception of the same data if a CA is applied |
| FFF4-FFFF | Logical path incapable of the duplicate transmission and reception of the same data if a CA is applied |

The UE that has received the configuration message may recognize that the specific logical path is a logical path for duplicating and transmitting the same data through the ID or the indicator.

After the configuration of the logical path is completed, the UE transmits a configuration complete message (e.g., RRC Connection Reconfiguration Complete message) to the base station (S8020).

Thereafter, if the aforementioned CA is applied through the configured specific logical path, the base station and the UE may transmit and receive multiple same data in multiple CCs to which a CA has been applied through the specific logical path (S8030).

That is, data having the ID of the specific logical path can be duplicated, transmitted and received through multiple CCs.

For example, if the uplink data of the specific logical path is scheduled/priority-handled in the UE, the same uplink data may be duplicated and transmitted to the base station through multiple CCs.

Furthermore, although the downlink data has occurred, the base station may transmit the same downlink data to the UE through multiple CCs of the specific logical path.

In this case, the uplink data and/or the downlink data may be a MAC PDU format.

Through such a method, the UE and/or the base station can configure a separate logical path for duplicating and transmitting the same data, and can improve reliability of data transmission and reception by duplicating and transmitting the same data through the configured logical path.

Figure 9:
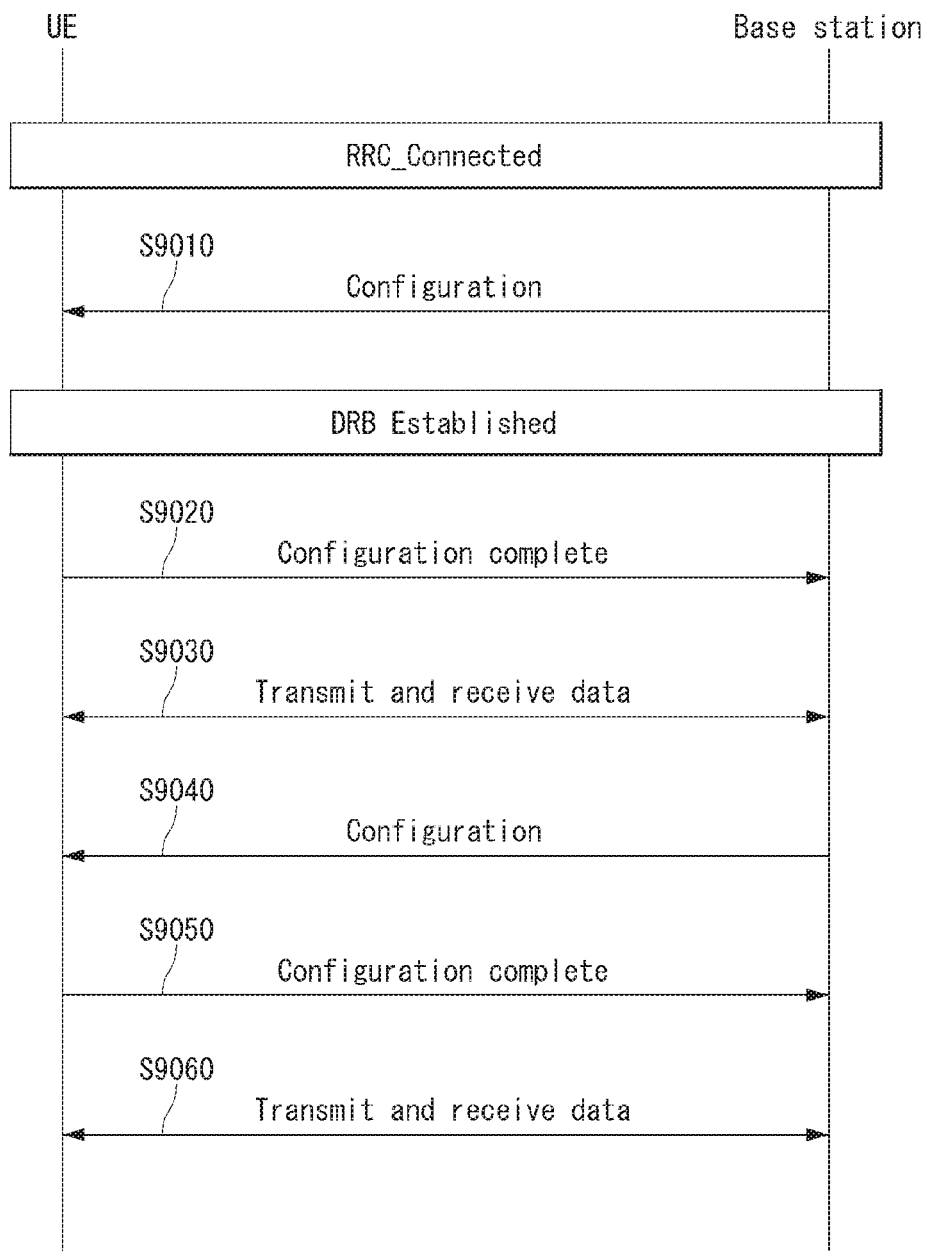
FIG. 9 is a flowchart showing another example of a method for configuring a logical path for transmitting the same data, which is proposed in this specification.

FIG. 9 is a flowchart showing another example of a method for configuring a logical path for transmitting the same data, which is proposed in this specification.

Referring to FIG. 9, the same data may be duplicated, transmitted and received by changing the configuration of a specific logical path of already configured logical paths.

Specifically, a base station may configure a logical path with a UE of a connection state.

In this case, in the logical path configuration process, the base station may transmit a configuration message (first control information), for example, an RRC Connection Reconfiguration message to a UE (S9010).

Thereafter, when the logical path configuration is completed, the UE may transmit a configuration complete message to the base station (S9020), and may transmit and receive data through CCs of the configured logical path (S9030).

After the logical path is configured, the base station may transmit a configuration message to the UE if the base station attempts to duplicate and transmit the same data by changing the configuration of a specific logical path of the configured logical paths (S9040).

In this case, the configuration message may be an RRC message form, and may indicate whether the duplicate transmission of the same data of the specific logical path of the configured logical paths will be enabled/disabled.

For example, the configuration message may include the ID (e.g., drb-Identity in LTE/LTE-A) of a specific logical path along which the same data is to be duplicated and transmitted or an indicator indicating that the specific logical path is a logical path for duplicating and transmitting the same data.

In this case, the indicator may be extended to 2 bits or more by extending it in the type information form of the specific logical path. For example, a type for indicating a specific logical path configured for each service that requires the duplicate transmission of the same data may be defined.

The UE that has received the configuration message may recognize that the specific logical path is a logical path for duplicating and transmitting the same data through the ID or the indicator.

In this case, the base station may implicitly notify the UE whether the duplicate transmission of the same data is possible or impossible in the specific logical path through the configuration message. The UE may make possible or impossible the same data duplicate transmission by changing the configuration of the specific logical path.

Alternatively, the base station may explicitly indicate whether the same data duplicate transmission in the specific logical path is possible through the indicator with respect to the UE.

Thereafter, the UE may transmit a configuration complete message to the base station (S9050). The configuration complete message may be an RRC message form.

After the configuration of the specific logical path is changed, if the duplicate transmission of the same data is possible in the specific logical path and the aforementioned CA is applied in the UE, the base station and the UE may transmit and receive multiple same data in multiple CCs to which the CA has been applied through the specific logical path (S9060).

That is, data having the ID of the specific logical path can be duplicated, transmitted and received through multiple CCs.

For example, if the uplink data of the specific logical path is scheduled/priority-handled in the UE, the same uplink data may be duplicated and transmitted to the base station through multiple CCs.

Furthermore, although downlink data has occurred, the base station may transmit the same downlink data to the UE through multiple CCs of the specific logical path.

In this case, the uplink data and/or the downlink data may be a MAC PDU format.

Through such a method, the UE and/or the base station can improve reliability of data transmission and reception by duplicating and transmitting the same data through a change of the configuration of an already configured logical path.

Figure 10:
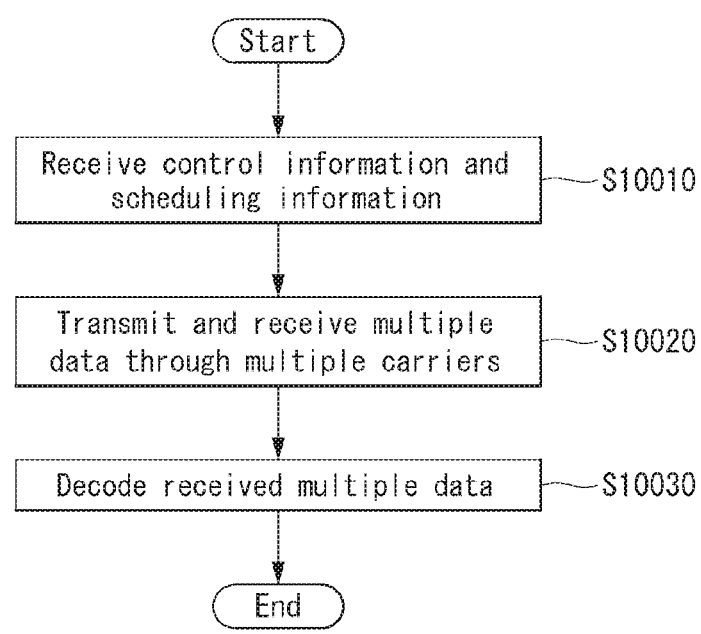
FIG. 10 is a flowchart showing an example of a method for transmitting the same downlink data, which is proposed in this specification.

FIG. 10 is a flowchart showing an example of a method for transmitting the same downlink data, which is proposed in this specification.

Referring to FIG. 10, the same downlink data may be duplicated and transmitted through multiple CCs by transmitting a recognizer providing notification of the transmission and reception of the same downlink data through physical layer control information.

Specifically, after the aforementioned logical path is configured, a base station may transmit control information (second control information) for downlink data transmission and scheduling information related to a resource for the downlink data transmission to a UE (S10010).

The base station may provide notification that downlink data transmitted through multiple component carriers (CCs) of the configured logical path is the same downlink data through the control information.

For example, the base station may include an indicator indicating whether downlink data transmitted through a CC is the same in control information (e.g., downlink control information transmitted through a PDCCG/ePDCCH in the 3GPP LTE/LTE-A system) transmitted through a channel of the physical layer, and may transmit the control information.

In this case, a method of transmitting the control information and scheduling information may include a method not using a cross-carrier scheduling method and a method using the cross-carrier scheduling method.

First, if the cross-carrier scheduling method is not used, that is, if radio resource allocation information about each CC is included in a control channel (e.g., a PDCCH/ePDCCH that is a physical layer control channel) allocated for each CC, an identifier, indicating that the same downlink data is duplicated and transmitted through multiple different CCs, may be transmitted in physical channel control information so that the same downlink data can be duplicated and transmitted through multiple different CCs.

For example, the base station may include an identifier, indicating that the same downlink data is transmitted through multiple different CCs, in physical layer control information (e.g., downlink control information (DCI) transmitted through a PDCCH/ePDCCH of an LTE/LTE-A system), and may transmit the physical layer control information to the UE.

In this case, the same downlink data may be a MAC PDU format, and may be transmitted through different downlink data channels (e.g., PDSCHs in LTE/LTE-A).

For example, if first data and second data identical with the first data are transmitted and received through multiple CCs, the first data may be transmitted and received through a first data channel on a first CC. The second data may be transmitted and received through a second data channel on a second CC.

The base station may transmit downlink scheduling information for each CC through the control channel so that the UE can duplicate and receive the same downlink data in the multiple different CCs.

In this case, the scheduling information may mean a frequency of a radio resource and time position information of a resource in which the same downlink data is transmitted, and may include information of the UE, frequency and time information of a radio resource of the downlink data channel, and transport area information of the downlink data channel.

An identifier indicating whether a CC is a CC in which the same downlink data is transmitted may be transmitted for each CC. If a CC is a CC in which the same downlink data is transmitted, the identifier may be set to "0." If not, the identifier may be "1."

For example, the identifier included in control information about each CC may be the same as below.
DCI for CC1: DL grant for CC1, MAC PDU indicator=0,
DCI for CC2: DL grant for CC2, MAC PDU indicator=0,
DCI for CC3: DL grant for CC1, MAC PDU indicator=1, In the above example, the CC1 and the CC2 may transmit downlink data generated from the same MAC PDU because the identifiers of the CC1 and the CC2 are identically set to "0". The CC2 may transmit downlink data generated from a different MAC PDU because the identifier of the CC3 is set as "1."

Or the identifier may be transmitted through one CC (e.g., PCell). In this case, the identifier may indicate whether multiple different CCs transmit the same downlink data.

For example, an identifier including control information about one CC may be the same as below.

DCI for CC1: DL grant for CC1, MAC PDU indicator=ON
DCI for CC2: DL grant for CC1, MAC PDU,
DCI for CC3: DL grant for CC1, MAC PDU, In the above example, since the indicator of the CC1 is set as "ON", the CC1, CC2, and CC3 may transmit downlink data generated from the same MAC PDU. If the indicator is set as "OFF", the CC1, CC2, and CC3 may transmit downlink data generated from different MAC PDUs.

In this case, the indicator may be substituted with a codeword or transport block indicator in a physical layer viewpoint.

Second, if the cross-carrier scheduling method is used, that is, if radio resource allocation information of another CC is included in addition to a corresponding CC as a control channel allocated to one CC, an identifier indicating that the same downlink data is duplicated and transmitted through multiple different CCs may be transmitted in physical channel control information so that the same downlink data can be duplicated and transmitted through multiple different CCs.

For example, a base station may include an identifier, indicating that the same downlink data is transmitted through one of multiple different CCs, in physical layer control information (e.g., downlink control information (DCI) transmitted through a PDCCH/ePDCCH of an LTE/LTE-A system), and may transmit the physical layer control information to a UE.

In this case, the same downlink data may be a MAC PDU format, and may be transmitted through different downlink data channels (e.g., PDSCHs in LTE/LTE-A).

The base station may transmit downlink scheduling information about each CC through one of the multiple CCs so that the UE can duplicate and receive the same downlink data in multiple different CCs.

In this case, the scheduling information may mean a frequency of a radio resource and time position information of a resource in which the same downlink data is transmitted, and may include information of the UE, frequency and time information of a radio resource of the downlink data channel, and transport area information of the downlink data channel.

The identifier indicating whether a CC is a CC in which the same downlink data is transmitted may be transmitted through one (e.g., PCell) of the multiple CCs. In this case, the identifier may indicate whether multiple different CCs transmit the same downlink data.

For example, the identifier included in control information about the one CC may be the same as below.

DCI for CC1: DL grant for CC1, MAC PDU indicator=ON
DCI for CC2: DL grant for CC1, MAC PDU,
DCI for CC3: DL grant for CC1, MAC PDU, In the above example, by setting the indicator of the CC1 as "ON", the CC1, CC2, and CC3 may transmit downlink data generated from the same MAC PDU. If the indicator is set as "OFF", the CC1, CC2, and CC3 may transmit downlink data generated from different MAC PDUs.

In this case, the indicator may be substituted with a codeword or a transport block indicator in a physical layer viewpoint.

The UE that has successfully received the control information and scheduling information through the control channel may recognize whether the same downlink data is transmitted through multiple different CCs based on the identifier included in the control information, and may receive downlink data through multiple CCs in a downlink data channel indicated by the scheduling information (S10020).

Thereafter, the UE may decode the received multiple same downlink data (S10030).

In this case, the UE may recognize whether the multiple downlink data received from multiple different CCs is the same downlink data based on the identifier, and may add up and decode the signals of the multiple different CCs in the downlink data channel decoding process from the multiple different CCs.

The add-up decoding method of the signals of the multiple different CCs may be various, and the following method may be used.

First, an extending channel coding method may be used. That is, this is a method of applying channel coding so that different parity bits of a codeword encoded in multiple different CCs can be decoded in one decoder.

Specifically, there may be an information bit repetition channel coding or information bit non-repetition channel coding method.

The information bit repetition channel coding is a method of identically setting information bits within a transport block (TB) in multiple different CCs and differently setting parity bits. The parity bits of multiple different CCs may be set so that they do not overlap by previously designating a parity bit to be used when downlink data is encoded.

For example, if N CCs are present, parity bits generated upon encoding is divided into N groups, and only a parity bit within a group is used in each CC. A UE that has received a message including downlink data can be aware of group information of a parity bit transmitted in each CC, and may arrange parity bits within a TB transmitted in each CC for each group and perform decoding.

In the case of the information bit non-repetition channel coding, allocated multiple TBs may be generated into one group TB (first transport block) in multiple different CCs, and channel coding may be performed based on the size of the group TB. In the case of this method, a gain of channel coding may be high, but decoding may be possible only when all of TBs transmitted from multiple different CCs that transmit the same downlink data are received.

Second, a separated channel coding method may be used. The separated channel coding method may include a repetition-based LLR combining method or a hard value combining method.

The repetition-based LLR combining method is a method of applying the TB of the same size in multiple different CCs and duplicating and transmitting the same TB. A UE that has received a message including the same downlink data through the multiple different CCs may calculate a log likelihood ratio (LLR) value by independently performing a process prior to decoding.

The calculated LLR values are added up and used as one decoder input value, and decoding may be performed.

The hard value combining method is a method of applying the TB of the same size in multiple different CCs and duplicating and transmitting the same TB. A UE may independently perform decoding TBs received in multiple different CCs.

In this case, if the decoding of any one of the TBs transmitted through the respective CCs is successful, the UE may determine that message reception has been successful.

In the present invention, the same downlink data may be a MAC PDU format.

In another embodiment of the present invention, a base station may duplicate and transmit the same downlink data through some of multiple CCs and may duplicate and transmit the same downlink data different from the same downlink data through other some CCs through the methods described in FIGS. 22 to 25.

For example, a base station may duplicate and transmit first downlink data through a CC1 to a CC3, and may duplicate and transmit second downlink data through a CC 4 and a CC 5.

Furthermore, in the present invention, the identifier may be included in higher layer control information and transmitted. For example, if the same downlink data is duplicated and transmitted through semi-persistent scheduling (SPS), scheduling information may be transmitted to a UE through a control signal of an RRC layer not a physical layer control signal. In this case, the identifier may be transmitted to the UE through the control signal of the RRC layer.

Furthermore, the present invention may be applied to dual connectivity (DC) in which multiple can be transmitted at the same time in addition to the CA.

Through such a method, a base station may duplicate and transmit the same downlink data to a UE, and can improve reliability of data transmission by duplicating and transmitting the same downlink data.

Figure 11:
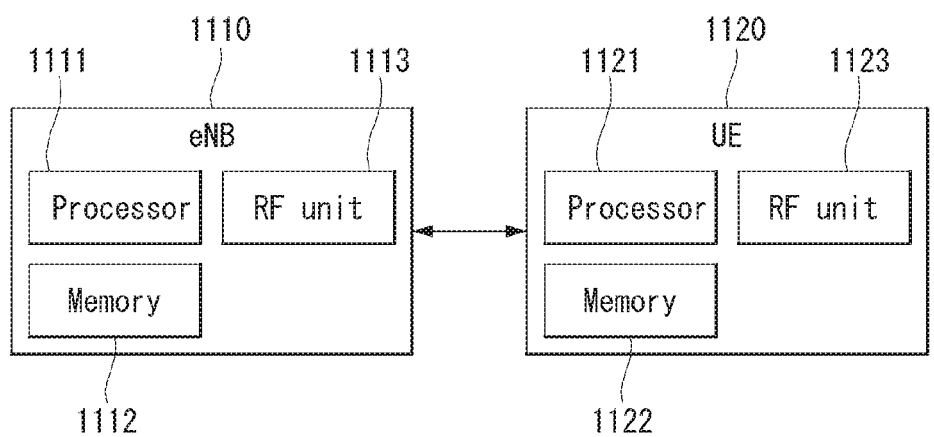
FIG. 11 is a diagram showing an example of an internal block diagram of a wireless apparatus to which the present invention may be applied.

FIG. 11 is a diagram showing an example of an internal block diagram of a wireless apparatus to which the present invention may be applied.

In this case, the wireless apparatus may be a base station and a UE. The base station includes all of a macro base station and a small base station.

As shown in FIG. 11, the base station 1110 and the UE 1120 includes communication units (transmission and reception units, RF units), 1113 and 1123, processors 1111 and 1121, and memory 1112 and 1122.

In addition, the base station and the UE may further include input units and output units.

The communication unit 1113, 1123, the processor 1111, 1121, the input unit, the output unit, and the memory 1112, 1122 are functionally connected in order to perform the methods proposed in this specification.

The communication unit (transmission and reception unit or RF unit) 1113, 1123 moves received information to a radio-frequency (RF) spectrum when the information generated from a physical layer (PHY) protocol is received, performs filtering, amplification, etc. on the information, and transmits the information to an antenna. Furthermore, the communication unit functions to move a radio frequency (RF) signal received from the antenna to a band that may be processed in the PHY protocol and to perform filtering.

Furthermore, the communication unit may include a switch function for switching such transmission and reception functions.

The processor 1111, 1121 implements the functions, processes and/or methods proposed in this specification. The layers of a radio interface protocol may be implemented by the processor.

The processor may be expressed as a control unit, a controller, a control unit or a computer.

The memory 1112, 1122 is connected to the processor and stores a protocol or parameter for performing an uplink resource allocation method.

The processor 1111, 1121 may include application-specific integrated circuits (ASICs), other chipsets, logic circuits and/or data processors. The memory may include read-only memory (ROM), random access memory (RAM), flash memory, a memory card, a storage medium and/or other storage devices. The communication unit may include a baseband circuit for processing a radio signal. When an embodiment is implemented by software, the aforementioned scheme may be implemented by a module (process, function) to perform the aforementioned function.

The module is stored in the memory and may be executed by the processor. The memory may be positioned inside or outside the processor and may be connected to the processor by various well-known means.

The output unit (display unit or indication unit) is controlled by the processor, and output a variety of types of information output by the processor along with a key input signal generated by the input unit and various information signals from the processor.

Furthermore, the drawings have been divided and described for convenience of a description, but a new embodiment may be designed so that it is implemented by merging the embodiments described with reference to the drawings. Furthermore, the range of right of the present invention also includes designing a computer-readable recording medium in which a program for executing the aforementioned embodiments has been written according to the needs of those skilled in the art.

The direction-based device search method according to this specification is not limited and applied to the configurations and methods of the aforementioned embodiments, but some or all of the embodiments may be selectively combined and configured so that the embodiments are modified in various ways.

Meanwhile, the direction-based device search method of this specification may be implemented in a recording medium, readable by a processor included in a network device, in the form of code readable by a processor. The processor-readable recording medium includes all types of recording devices in which data readable by a processor is stored. The recording medium may include ROM, RAM, CD-ROM, magnetic tapes, floppy disks, and optical data storages, for example. Furthermore, the processor-readable recording medium may be distributed to computer systems connected over a network, and the processor-readable code may be stored and executed in a distributed manner.

Furthermore, although some embodiments of this specification have been illustrated and described above, this specification is not limited to the aforementioned specific embodiments, and a person having ordinary skill in the art to which this specification pertains may modify the present invention in various ways without departing from the gist of the claims. Such modified embodiments should not be individually interpreted from the technological spirit or prospect of this specification.

Furthermore, in this specification, both the apparatus invention and the method invention have been described, but the descriptions of both the inventions may be complementary applied, if necessary.

INDUSTRIAL APPLICABILITY

The RRC connection method in a wireless communication system of the present invention has been described based on an example in which it is applied to the 3GPP LTE/LTE-A system, but may be applied to various wireless communication systems in addition to the 3GPP LTE/LTE-A system.

What is claimed is:

1. A method performed by for a user equipment (UE) in a wireless communication system, the method comprising:
receiving, from a base station, a radio resource control (RRC) reconfiguration message,
wherein the RRC reconfiguration message includes configuration information that includes both i) information for configuring an uplink duplication transmission and ii) information on a logical channel identifier (ID) associated with the uplink duplication transmission;
transmitting, to the base station, a RRC reconfiguration complete message;
based on the uplink duplication being configured for the radio bearer, receiving, from the base station, control information on an indication for the uplink duplication transmission of the radio bearer; and
transmitting, to the base station, the uplink duplication transmission associated with the logical channel ID,
wherein the uplink duplication transmission is performed on a cell group corresponding to the logical channel ID.

2. The method of claim 1, wherein the uplink duplication transmission is transmitted through different cells.

3. The method of claim 2, wherein:
the different cells are included in the cell group.

4. The method of claim 3, further comprising:
receiving scheduling information for the first data and second data of the uplink duplication transmission from the base station,
wherein the scheduling information comprises at least one of resource information for transmission of the first data and the second data, information of the UE.

5. A user equipment operating in a wireless communication system, the user equipment comprising:
at least one transceiver configured to transmit and receive a wireless signal; and
at least one processor configured to control the at least one transceiver,
wherein the at least one processor configured to:
receive, from a base station, a radio resource control (RRC) reconfiguration message,
wherein the RRC reconfiguration information includes configuration information, and
wherein the configuration information includes both i) information for configuring uplink duplication transmission and ii) information on a logical channel a logical channel identifier (ID) associated with the uplink duplication transmission,
transmit, to the base station, a RRC reconfiguration complete message,
based on the uplink duplication being configured for the radio bearer, receive, from the base station, control information on an indication for the uplink duplication transmission of the radio bearer, and
transmit, to the base station, the uplink duplication transmission associated with the logical channel ID,
wherein the uplink duplication transmission is performed on a cell group corresponding to the logical channel ID.

6. A base station operating in a wireless communication system, the base station comprising:
at least one transceiver configured to transmit and receive a wireless signal; and
at least one processor configured to control the at least one transceiver,
wherein the at least one processor configured to:
transmit, to a user equipment (UE), a radio resource control (RRC) reconfiguration message,
wherein the RRC reconfiguration message includes configuration information, and
wherein the configuration information includes both i) information for configuring uplink duplication transmission and ii) information on a logical channel identifier (ID) associated with the uplink duplication transmission;
receive, from the UE, a RRC reconfiguration complete message;
based on the uplink duplication being configured for the radio bearer, transmit, to the UE, control information on an indication for the uplink duplication transmission of the radio bearer; and
receive, from the UE, the uplink duplication transmission associated with the logical channel ID,
wherein the uplink duplication transmission is performed on a cell group corresponding to the logical channel ID.

* * * * *